United States Patent
Carey et al.

(10) Patent No.: US 8,631,920 B2
(45) Date of Patent: Jan. 21, 2014

(54) SYSTEM AND METHOD FOR ATTACHING A DUAL CLUTCH TO A FLYWHEEL

(75) Inventors: Clinton E. Carey, Highland, MI (US); Daryl A. Wilton, Macomb, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 587 days.

(21) Appl. No.: 12/884,473

(22) Filed: Sep. 17, 2010

(65) Prior Publication Data

US 2011/0079480 A1 Apr. 7, 2011

Related U.S. Application Data

(60) Provisional application No. 61/248,617, filed on Oct. 5, 2009.

(51) Int. Cl.
*F16D 13/58* (2006.01)
*F16D 25/10* (2006.01)
*F16D 21/06* (2006.01)

(52) U.S. Cl.
USPC ............... 192/48.8; 192/48.603; 192/48.6; 192/70.16

(58) Field of Classification Search
USPC ............... 192/48.603, 48.607, 70.16, 112
See application file for complete search history.

(56) References Cited

U.S. PATENT DOCUMENTS

| | | | | | |
|---|---|---|---|---|---|
| 3,317,013 | A | * | 5/1967 | Smirl | 192/112 |
| 5,927,459 | A | * | 7/1999 | Kajitani et al. | 192/112 |
| 6,142,279 | A | * | 11/2000 | Kajitani et al. | 192/70.16 |
| 6,830,140 | B2 | * | 12/2004 | Zink et al. | 192/70.16 |
| 8,162,117 | B2 | * | 4/2012 | Reimnitz | 192/48.8 |
| 2005/0121281 | A1 | * | 6/2005 | Orlamunder et al. | 192/70.16 |

* cited by examiner

*Primary Examiner* — David D Le
*Assistant Examiner* — Jacob S Scott

(57) ABSTRACT

An apparatus for transferring torque from a crankshaft to a dual input transmission includes: a flywheel connected at one end to the crankshaft and at the opposite end to a torque transmitting device or dual clutch. The flywheel has a first coupling member that is configured to engage a second coupling member attached to a center plate of the dual clutch. The first coupling member is fixedly secured to the second coupling member by a fastening means. A dual clutch actuation device generates the axial compression force required to compress a first and second set of frictional elements of a dual clutch.

15 Claims, 3 Drawing Sheets

SYSTEM AND METHOD FOR ATTACHING A DUAL CLUTCH TO A FLYWHEEL

CROSS-REFERENCE TO RELATED APPLICATIONS

This application claims the benefit of U.S. Provisional Application No. 61/248,617, filed on Oct. 5, 2009, which is hereby incorporated in its entirety herein by reference.

TECHNICAL FIELD

The present disclosure relates to transmissions and more particularly to a system and method for attaching a dual clutch to a flywheel to achieve a compact, dual clutch multiple speed transmission.

BACKGROUND

The statements in this section merely provide background information related to the present disclosure and may or may not constitute prior art.

A typical dual input multiple speed transmission has a first input shaft and a second input shaft that is a hollow sleeve shaft that is concentric with the first input shaft. The first and second input shafts are selectively coupled to the engine crankshaft through a dual clutch. The dual or twin clutch has two independent clutch units that are each separately rotationally fixed to one of the input shafts. The clutch units include friction elements that are axially compressed against friction elements that are ultimately rotationally fixed to the crankshaft. A dual clutch actuation device generates the apply force necessary to axially compress the friction elements and rotationally couple the input shafts with the crankshaft.

While current dual clutches achieve their intended purpose, the need for new and improved configurations which exhibit improved performance, is essentially constant. For example, one problem not addressed by the prior art is the relative movement between the flywheel and the dual clutch module. Accordingly, there is a need in the art for a dual clutch having improved torque transfer capability, packaging and ease of assembly while providing a mechanism to reduce or eliminate noise or vibration.

SUMMARY

The present invention provides a dual clutch and flywheel assembly for a dual clutch transmission. The transmission has two input shafts a first shaft and a second shaft that is a hollow sleeve shaft. The second shaft is concentric with the first shaft. The dual clutch has two clutch units that selectively couple a crankshaft of an engine to one of the two input shafts. More specifically, the dual clutch includes members such as a clutch housing having a first set of frictional elements that are rotationally fixed to the crankshaft through a flywheel and other members such hubs having a second set of frictional elements that are rotationally fixed to the input shafts. The first and second frictional elements are axially compressed against each other to couple one of the hubs to the dual clutch housing, thereby transmitting torque from the crankshaft to one of the input shafts.

A dual clutch actuation device is provided to generate the axial compression force required to compress the first and second set of frictional elements. Dual clutch actuation device includes a first and second annular piston. The annular pistons include a first end that is in contact with annular bearing assemblies. The annular bearing assemblies are in contact with actuation levers that are in contact with the first set of frictional elements. The annular pistons are arranged in concentric annular piston slots. Together the piston and annular slots form annular piston chambers. The piston chambers are filled with hydraulic fluid. When the hydraulic fluid is pressurized the pistons slide out of the annular slots and apply a force on the actuation levers which in turn apply an axial compression force on the frictional elements.

In one aspect of the present invention, the dual clutch includes a first coupling member formed in a center plate of the dual clutch.

In another aspect of the present invention, the first coupling member of the dual clutch includes a radial bore that is threaded and has an open end that opposes a flange or tab fixed to the flywheel.

In another aspect of the present invention, the flywheel includes a second coupling member fixedly attached to a periphery of the flywheel wherein the second coupling member opposes the first coupling member of the dual clutch.

In yet another aspect of the present invention, a pin or bolt is provided that is configured to engage the first and second coupling members.

The above features and advantages and other features and advantages of the present invention are readily apparent from the following detailed description of the best modes for carrying out the invention when taken in connection with the accompanying drawings.

DESCRIPTION

Figure 1A:
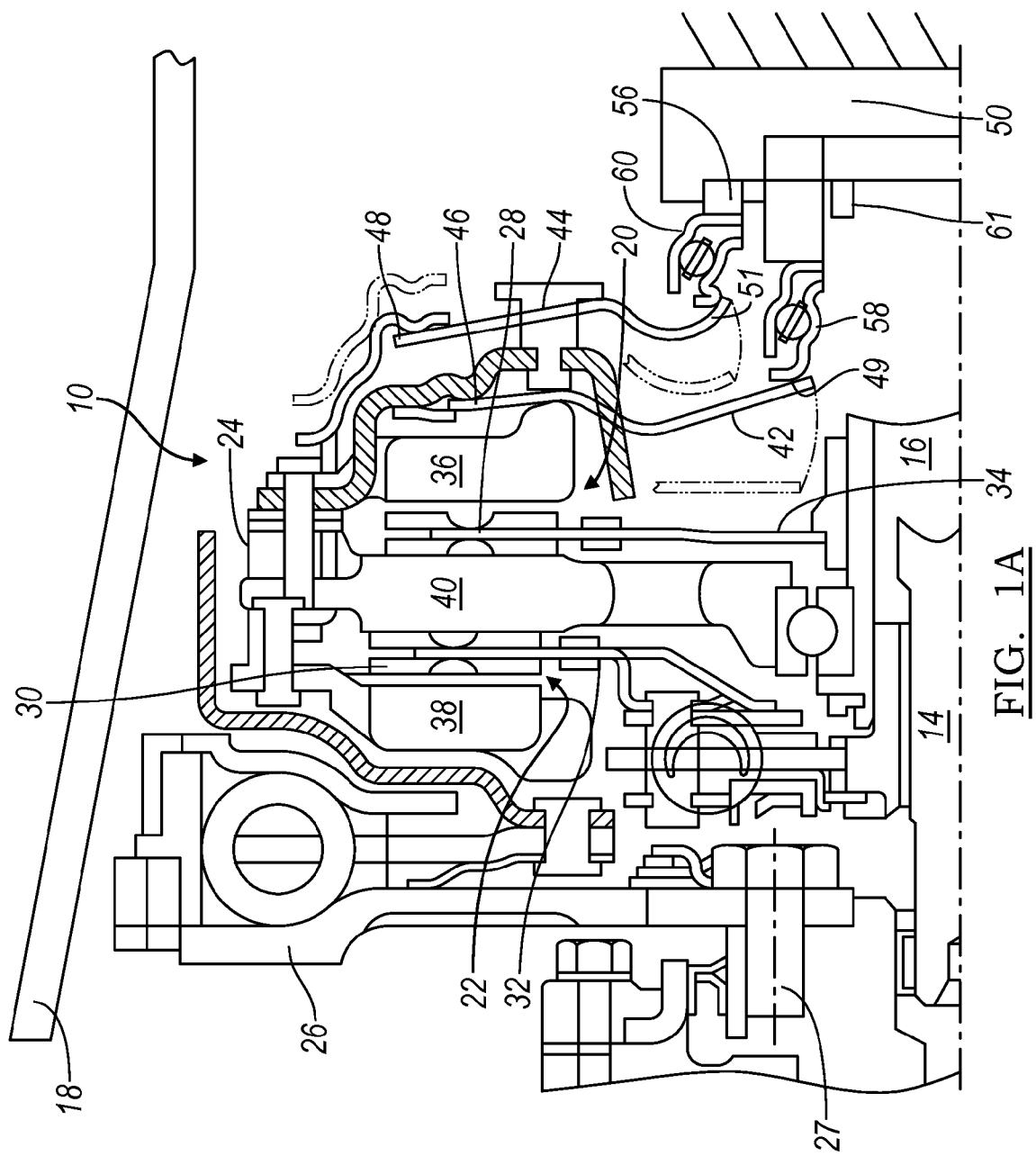
FIGS. 1A and 1B is a partial cross-sectional view of a torque transmitting device, actuation device and flywheel for a dual input transmission, in accordance with an embodiment of the present invention.
Figure 1B:
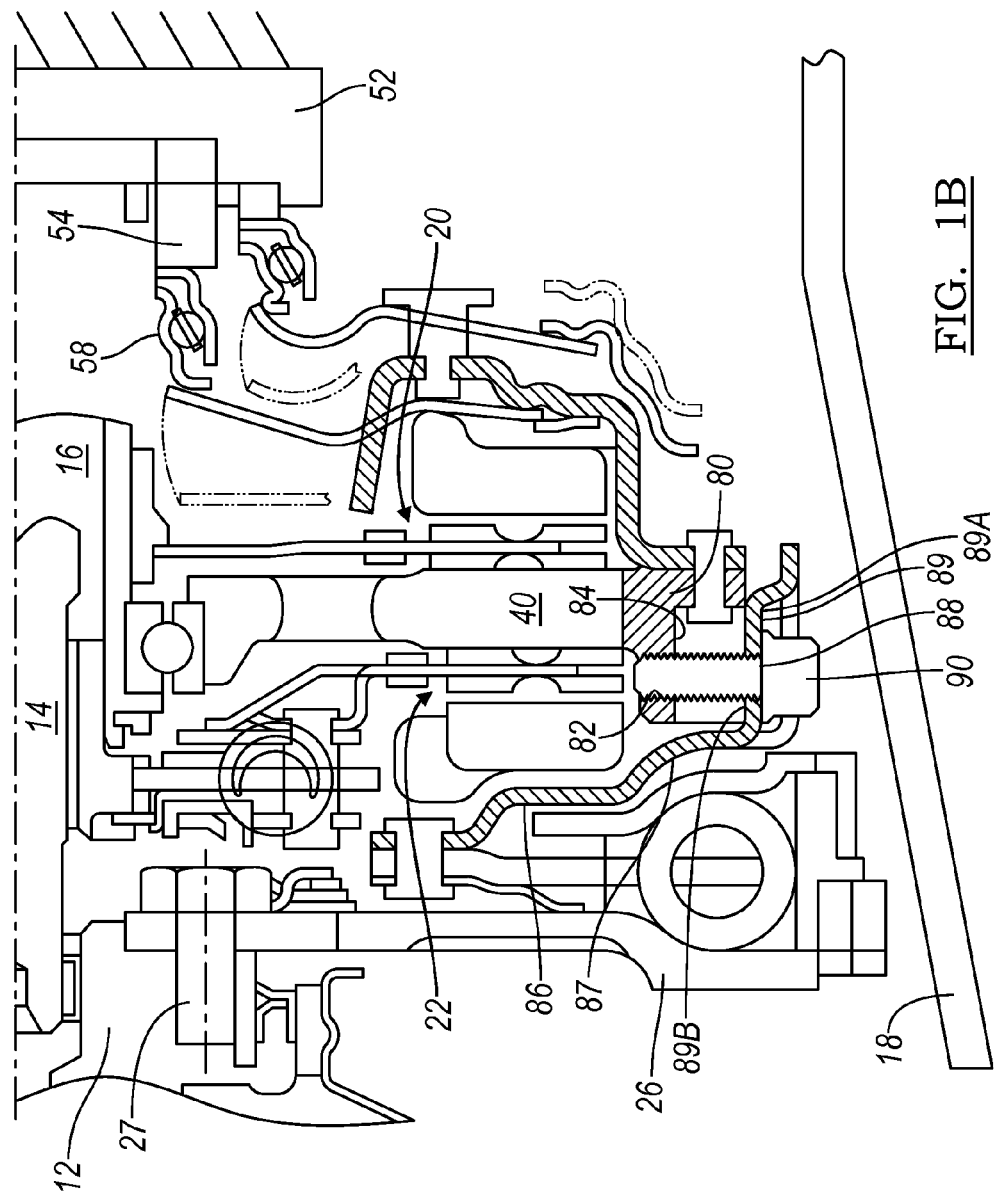

Referring to FIG. 1, a partial cross-sectional view of a torque transmitting device for a dual input transmission (not shown) is generally indicated by reference number 10. The torque transmitting device 10 is for example a dual clutch disposed in a vehicle powertrain. Typically the vehicle powertrain includes an engine (not shown) and a transmission (not shown). In the instant embodiment the transmission is a dual input transmission where torque is transferred through selective operation of torque transmitting device 10 from the engine via a crankshaft 12 to two input shafts in the transmission: a first input shaft 14 and a second input shaft 16. The second input shaft 16 is a sleeve (or hollow) shaft that is concentric with and overlies the first input shaft 14. Torque transmitting device 10 is disposed in a transmission housing or bell housing 18.

Torque transmitting device 10 has two separate and independent friction clutches 20 and 22 disposed in a clutch housing 24. Friction clutch 20 includes a friction member 28 and friction clutch 22 includes a friction member 30. Friction member 28 is fixed to a hub member 34. Friction member 30 is fixed to a hub member 32. Hub members 32 and 34 are each separately rotationally fixed to first and second input shafts 14 and 16, respectively. Clutch housing 24 also includes friction elements 36, 38 and a clutch center plate 40 that are each attached and rotationally fixed to housing 24. Friction members 28, 30, clutch center plate 40 and friction elements 36 and 38 are configured to form a friction clutch, as is known in the art as a dual clutch. Thus, selective engagement through axial compression of friction member 28 with friction element 36 and clutch center plate 40 connects the crankshaft 12 for common rotation with the second input shaft 16. Selective engagement of friction member 30 with friction element 38 and clutch center plate 40 connects the crankshaft 12 for common rotation with the first input shaft 14. Friction clutches 20 and 22 may include multiple friction members 28 and 30 that interact with a respective multiple of friction elements 36 and 38 connected to housing 24. The number and size of the friction members will vary based on appropriate torque transmission requirements. Of course, the torque transmission capability of device 10 may be varied by varying the number of friction elements and amount of surface area of each friction element.

Clutch housing 24 is rotationally fixed to a flywheel 26, as will be described in further detail below. Flywheel 26 is connected to crankshaft 12 by bolts or screws 27 or similar fastening means. Preferably, flywheel 26 is a dual mass flywheel that is configured to dampen and reduce vibration in the crankshaft 12.

The coupling of the crankshaft 12 to the input shafts 14 and 16 is achieved through axial compression of the friction elements and clutch center plate 40 by actuation levers or disks 42 and 44. Actuation levers or disks 42, 44 have first ends 46 and 48 that are in contact with and configured to pivot on housing 24. The second ends 49 and 51 of actuation levers 42, 44 are in contact with and configured to receive an apply force generated by an actuation device 50.

Actuation device 50 includes an annular housing 52, a pair of annular pistons 54 and 56 and a pair of bearing assemblies 58 and 60. Housing 52 is mounted and thus rotationally fixed to bell housing 18 and defines a central bore 61. The central bore 61 is sized to allow the first input shaft 14 and the second input shaft 16 to pass there through. Bearing assemblies 58 and 60 are actuation bearings that torsionally decouple the rotating elements of clutch 10 (i.e. housing 24 and actuation levers or disks 42 and 44) from the non-rotating members of the actuation device 50 (i.e. pistons 54 and 56).

Annular piston 56 is translated axially and presses bearing assembly 60 toward second end 51 of the actuation lever or disk 44. Actuation lever 44 pivots on housing 24 and compresses friction element 38 axially against friction member 30 and center plate 40 causing hub 32 to rotate at substantially the same speed as friction member 38. Thus, selectively rotationally coupling crankshaft 12 with first input shaft 14. Annular piston 54 is translated axially and presses bearing assembly 58 toward second end 49 of the actuation lever or disk 42. Actuation lever 42 pivots on housing 24 and compresses friction element 36 axially against friction member 28 and center plate 40 causing hub 34 to rotate at substantially the same speed as friction member 36. Thus, selectively rotationally coupling crankshaft 12 with second input shaft 16.

Figure 2:
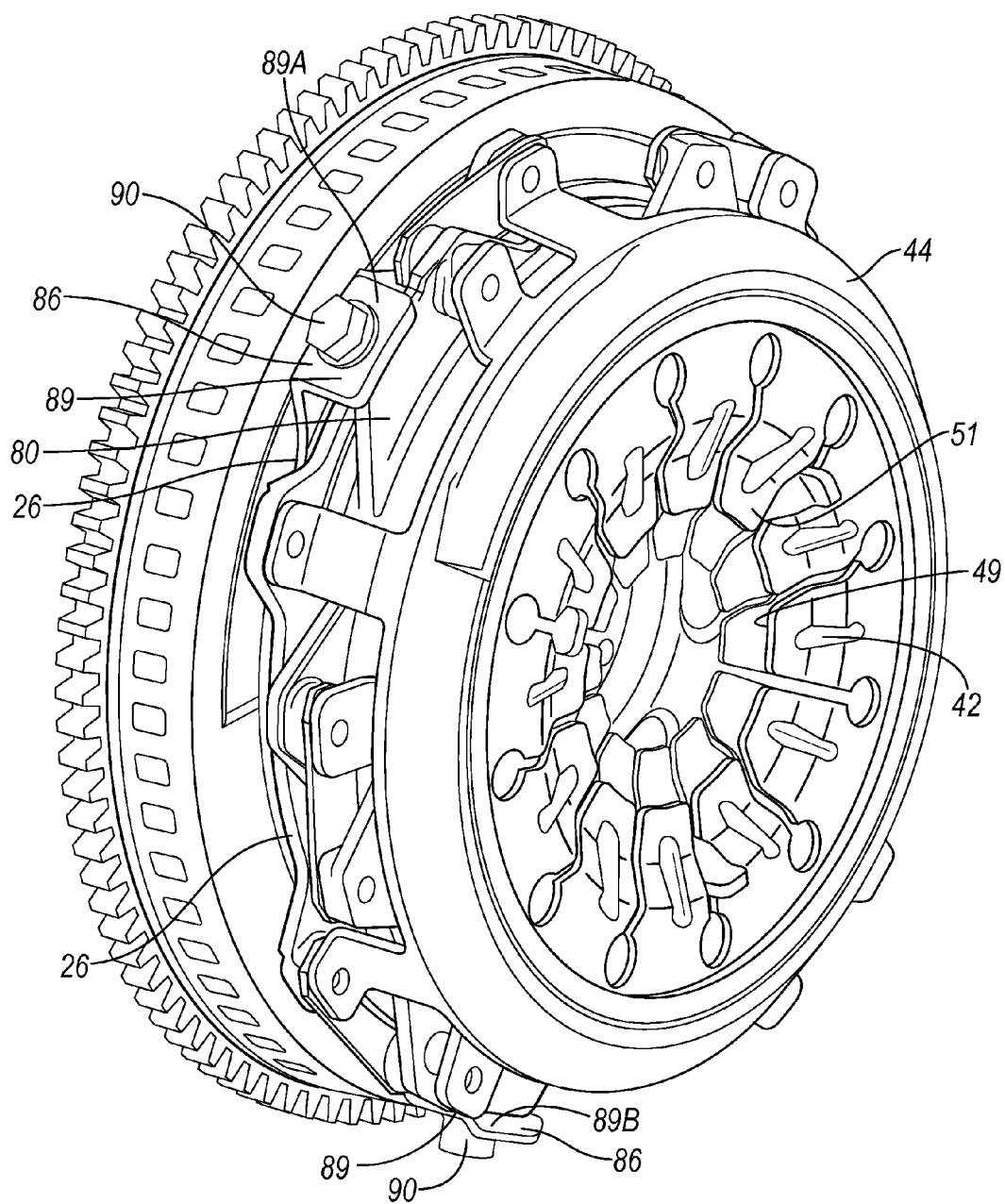
FIG. 2 is a perspective view of the torque transmitting device attached to the flywheel, in accordance with an embodiment of the present invention.

With continuing reference to FIG. 1 and referring also to FIG. 2, a perspective view the flywheel 26 and torque transmitting device 10 is illustrated, in accordance with an embodiment of the present invention. As illustrated the center clutch plate 40 includes a tab or first coupling member 80 formed in or fixed to a perimeter of plate 40. In the example provided, the first coupling member 80 is a flywheel for plate 40. Tab 80 includes a threaded bore 82 that has an open end 84. Open end 84 opposes or is open to connector disc or a second coupling member or tab/flange 86 attached to flywheel 26. Second coupling member or tab/flange 86 includes a through bore or aperture 88 that is aligned with threaded bore 82. Second coupling member or tab/flange 86 has a radially extending portion 87 and an axially extending portion 89. The axially extending portion 89 includes first and second sides 89A and 89B disposed opposite each other. The bore 88 extends through the axially extending portion 89 and therefore has openings on each of the first and second sides 89A and 89B. In the instant embodiment, at least three first coupling members 80 (only two shown) are disposed at equal distances around a periphery of plate 40. However, the present invention contemplates that in alternate embodiments additional first coupling members are disposed at equal distances around a periphery of plate 40.

As shown in FIGS. 1 and 2, torque transmitting device 10 is coupled for common rotation with flywheel 26 through mating engagement of first coupling member 80 with second coupling member 86. More specifically, in an embodiment of the present invention first coupling member 80 is mechanically secured to second coupling member 86 by an engagement member 90, such as a threaded bolt or pin. Threaded bolt or pin 90 is positioned through bore or aperture 88 and threaded into threaded bore 82 to rigidly and securely rotationally couple flywheel 26 to torque transmitting device or dual clutch 10.

The present invention has many advantages and benefits over the prior art. For example, the novel embodiments of the present invention utilize the required thickness of the center plate 40 to form radial threads that is required for heat sinking. Moreover the present embodiments provide a lower relative mass, a reduced radial and circumferential size as compared to comparable designs.

While the best modes for carrying out the invention have been described in detail, those familiar with the art to which this invention relates will recognize various alternative designs and embodiments for practicing the invention within the scope of the appended claims.

We claim the following:

1. A device for transmitting torque between a flywheel rotatably connected to an engine and a dual clutch transmission, the device comprising:
a first coupling member fixed to a perimeter of a dual clutch of the dual clutch transmission, wherein the first coupling member includes a discrete tab that extends radially out from the perimeter of the dual clutch, and wherein the first coupling member defines a first bore having a radial centerline and having an open end;
a second coupling member attached to a perimeter of the flywheel, the second coupling member having an outer perimeter and a radially extending, discrete tab protruding from the outer perimeter, and wherein the second coupling member includes a second bore disposed in the discrete tab having a radial centerline and configured to extend through the second coupling member from a first side of the second coupling member to a second side of the second coupling member; and
an engagement member disposed in the second bore and in the first bore thereby aligning the centerlines of the first and second bores and rotationally coupling the first coupling member with the second coupling member to allow the transfer of torque between the flywheel and the dual clutch transmission.

2. The device of claim 1 wherein the first coupling member is a clutch flywheel.

3. The device of claim 1 wherein the second coupling member is a support disc having a radially extending portion and an axially extending portion.

4. The device of claim 3 wherein the axially extending portion is positioned radially outboard of the first coupling member.

5. The device of claim 4 wherein the second bore is disposed through the axially extending portion.

6. The device of claim 1 wherein the first bore is threaded and the second bore is not threaded.

7. The device of claim 1 wherein the engagement member is a threaded bolt.

8. The device of claim 1 wherein three discrete tabs are disposed at equal distances around the perimeter of the dual clutch.

9. The device of claim 8 wherein the second coupling member includes three discrete tabs disposed at equal distances around the perimeter of the flywheel.

10. A device for transmitting torque between a flywheel rotatably connected to an engine and a dual clutch transmission, the device comprising:
 a clutch flywheel fixed to an outer perimeter of a dual clutch of the dual clutch transmission, wherein the clutch flywheel defines a first bore having a radial centerline and having an open end;
 a support disc attached to the flywheel, the support disc having an outer perimeter, and wherein the support disc includes a discrete tab having a radially extending portion protruding from the outer perimeter, wherein the support disc includes an axially extending portion extending axially from the radially extending portion, wherein the support disc includes a second bore having a radial centerline and configured to extend through the axially extending portion from a first side to a second side of the axially extending portion; and
 an engagement member disposed in the second bore and in the first bore thereby aligning the centerlines of the first and second bores and rotationally coupling the clutch flywheel with the support disc to allow the transfer of torque between the flywheel and the dual clutch transmission.

11. The device of claim 10 wherein the axially extending portion is positioned radially outboard of the clutch flywheel.

12. The device of claim 10 wherein the first bore is threaded and the second bore is not threaded.

13. The device of claim 10 wherein the engagement member is a threaded bolt.

14. A device for transmitting torque from an engine to a transmission, the device comprising:
 a flywheel assembly connected to the engine;
 a dual clutch connected to the transmission and having a center clutch plate disposed between two friction discs;
 a clutch flywheel fixed to an outer perimeter of the center clutch plate, wherein the clutch flywheel defines a first bore having a radial centerline and having an open end;
 a support disc attached to the flywheel assembly, the support disc having an outer perimeter, and wherein the support disc includes a discrete tab having a radially extending portion protruding from the outer perimeter, wherein the support disc includes an axially extending portion extending axially from the radially extending portion, wherein the support disc includes a second bore having a radial centerline and configured to extend through the axially extending portion from a first side to a second side of the axially extending portion; and
 an engagement member disposed in the second bore and in the first bore thereby aligning the centerlines of the first and second bores and rotationally coupling the clutch flywheel with the support disc to allow the transfer of torque between the flywheel assembly and the dual clutch.

15. The device of claim 14 wherein the axially extending portion is positioned radially outboard of the clutch flywheel.

* * * * *